A. M. ALLEN.
ELASTIC VARIABLE GEARING.
APPLICATION FILED MAR. 22, 1909.
1,026,237.
Patented May 14, 1912.
2 SHEETS—SHEET 1.
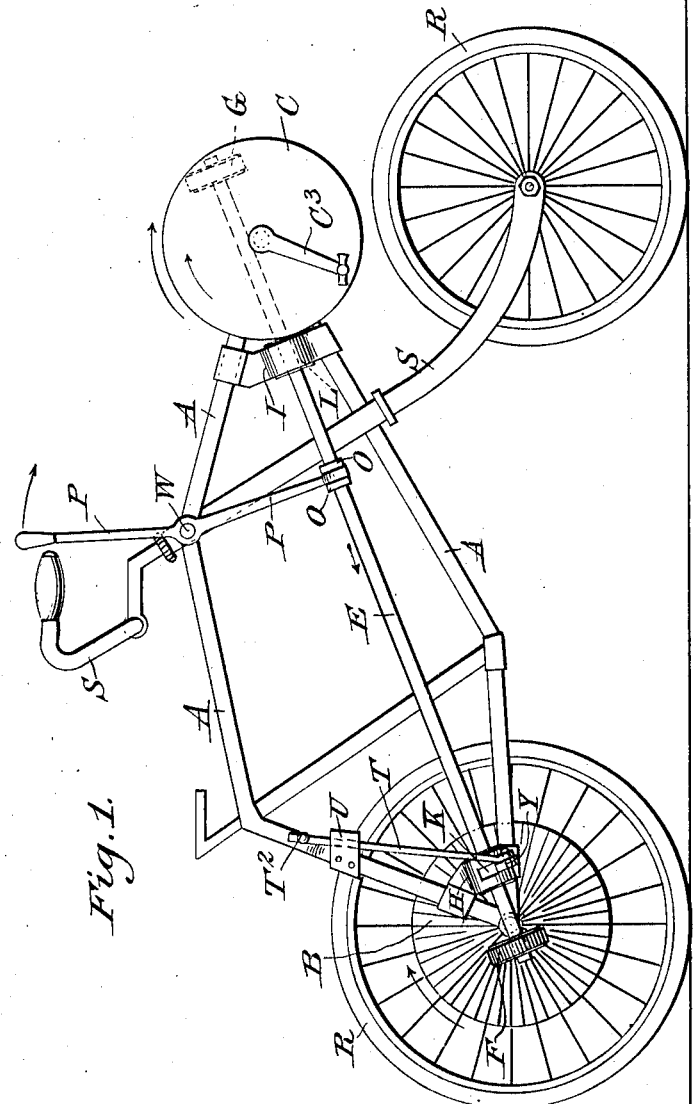
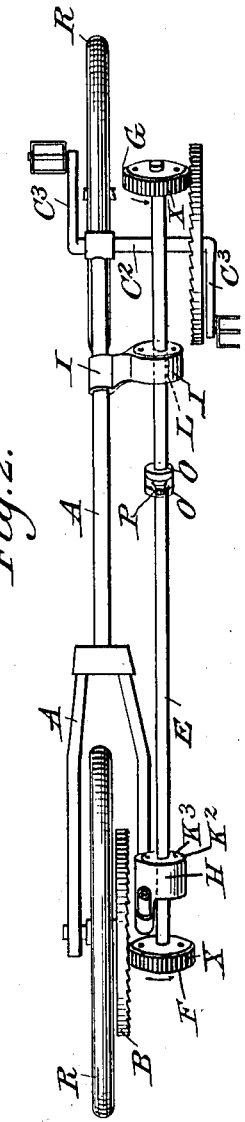
Witnesses:
F. H. Schott
W. H. Ourand
Inventor.
Arthur M. Allen A. M. ALLEN.
ELASTIC VARIABLE GEARING.
APPLICATION FILED MAR. 22, 1909.
1,026,237.
Patented May 14, 1912.
2 SHEETS—SHEET 2.
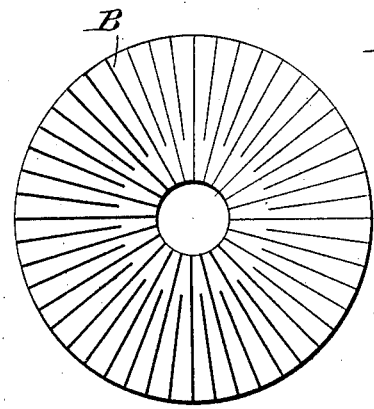
Fig. 6.
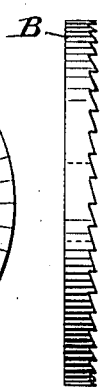
Fig. 7.
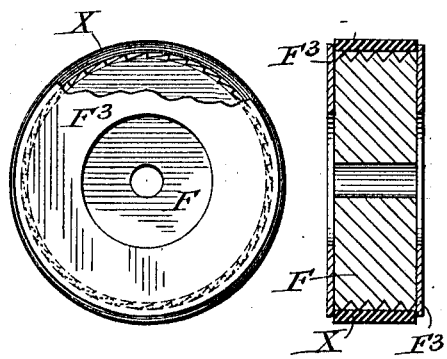
Fig. 4.   .5.
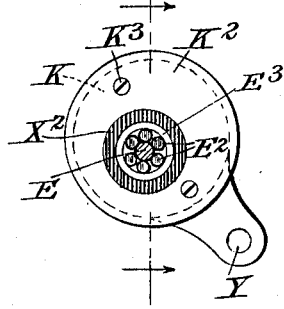
Fig. 8.
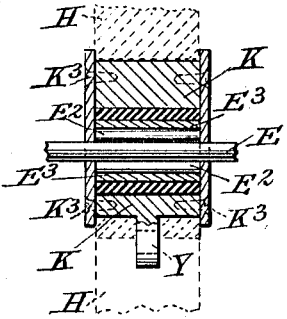
Fig. 9.
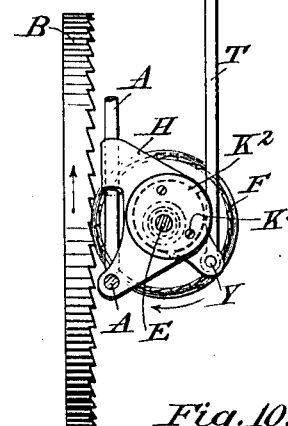
Fig. 3.
Fig. 10.
Witnesses:
F. H. Schott
W. H. Ourand
Inventor:
Arthur M. Allen

UNITED STATES PATENT OFFICE.

ARTHUR M. ALLEN, OF NEW BRIGHTON, NEW YORK.

ELASTIC VARIABLE GEARING.

1,026,237. Specification of Letters Patent. Patented May 14, 1912.

Application filed March 22, 1909. Serial No. 485,150.

*To all whom it may concern:*

Be it known that I, ARTHUR M. ALLEN, a citizen of the United States, and resident of New Brighton, in the county of Richmond and State of New York, have invented certain new and useful Improvements in Elastic Variable Gearing, of which the following is a specification.

This invention relates to the transmission of power and is an improvement on the gears faced with pyramidal points in my patent of Jan. 29th, 1895 Serial Number 533405 for road vehicles. In that patent the face or side of one of two gears in contact is covered with pyramid points and the other faced with leather, rubber, or other tough, and elastic material, in which construction the power transmitted is limited to the adhesion of the elastic material to its gear face.

This improvement consists, 1st, in making angular teeth on the contact surfaces of both the said gears, and arranging the said elastic and tough material between them, in the form of an adjustable tube covering one gear, whereby the teeth completely bury in both sides of the tube, giving better grip with less bearing friction, the tube being just so thick that the teeth will not meet when the gears are set for action.

2nd. In a further improved grip, by making the teeth ratchet shape, and arranging them inversely on the two gears, the vertical side of the ratchet tooth, being at right angles to the material, thereby realizing all its strength for power transmission, the strain on the bearings being less than in the aforesaid patent and much less than in friction gearing. In this example the surfaces with hard angular teeth constitute the peripheries of wheels, but I do not confine myself to them, but may use connected driven and driving devices, of any shape, whose operating surfaces are composed of hard angular teeth and connected by a tough and elastic membrane.

3rd. In such an arrangement of four of these gears and three shafts, that the relative speed of two shafts may be changed slowly at will, while in action, anywhere between the limits of construction, viz: two crown gears with hard ratchet teeth covering their sides, are mounted on two parallel shafts, and connected by a transverse shaft, carrying two ratchet faced pinions, covered by two rubber sleeves, the contact being adjusted by eccentrics around the shaft roller bearing tube, and a means to give this transverse shaft a longitudinal motion while in action, which increases the speed of one shaft and decreases that of the other by the one action. One crown gear and shaft, operated by one elastic sleeved pinion and shaft, may be used if desired. Flanges in the sides of the pinions keep the elastic sleeves in place. In action this gearing is silent.

I attain these objects by mechanism described and illustrated in the accompanying drawings, and specifications, in which—

Figure 1 is a side elevation of the invention as applied to a bicycle. Fig. 2 is a top view of the same. Fig. 3 is a side view of bearing holder H, eccentric K, eccentric rod T and pinion F in mesh with crown wheel B. Fig. 4 is the side of ratchet-toothed pinion F and rubber sleeve X. Fig. 5 is a section of Fig. 4. Fig. 6 shows side view of ratchet teeth on crown wheel B; Fig. 7 section of Fig. 6; Fig. 8 detent of eccentric K or L, with tube $P^3$, rollers $P^2$, cushion tube $X^2$, flanges $K^2$ and screws $K^3$; Fig. 9 edge view of Fig. 8. Fig. 10 shows separate detail of holder H.

In the drawing, Fig. 1, one ratchet crown gear B is mounted on the back wheel R, and a similar gear C, on the shaft $C^2$ of the foot driving gear. In two side extensions H, I of frame A, are two bearings $E^3$ in which is mounted a shaft E carrying two ratchet faced pinions F and G with flanges $K^2$ and covered with rubber sleeves X, one at each end of the shaft, said pinions engaging with the crown gears, whose ratchet teeth are arranged inversely with those in the pinions.

To engage or disengage the pinions F, G, from the crown gears B, C, the shaft bearing $E^3$ is set in an eccentric K provided with an ear Y, which connects to, and is operated by, a rod T and handle $T^2$ through a friction bearing U, by the rider. Two collars O on shaft E and a hand lever P with its fork between the collars and pivoted on a friction joint W, in the side of the frame A, allow the rider to move shaft E endwise, thereby changing the gear slowly, while in addition, the friction joint W being provided with a spring washer of steel or rubber, so that the hand lever P will always remain as set. When the gears are in mesh the gear cannot be changed unless in action.

What I claim as new, and desire to secure by Letters Patent is—

1. A driving gear and a driven gear, whose contact surfaces are hard angular teeth, said gears being separated beyond possible contact distance, in combination with a membrane of tough and elastic material, into which both sets of teeth bury without tearing, whereby the full tensile strength of the material is available for power transmission.

2. A driving pinion and a driven gear whose contact surfaces are hard angular teeth, said gears being separated beyond possible contact distance in combination with a tube of tough and elastic material covering the pinion, and means to keep the pinion teeth buried in the elastic material forming the elastic gearing.

3. A driving pinion and a driven gear, whose contact surfaces are hard ratchet shaped teeth, said gears being separated beyond possible contact distance, in combination with a tube of tough and elastic material covering the pinion, said tube being an elastic tensional connection between the gears, the whole thereby forming improved elastic gearing.

4. A frame, a shaft, a hard tooth ratchet crown gear fixed thereon, and mounted in said frame, an eccentric mounted in the frame, another shaft at right angles to the first, and mounted in the eccentric, and a ratchet faced pinion carried thereby, and a tough and elastic tube covering the pinion, in combination with means to give the pinion shaft, both rotary and endwise motion, and means to control the position of the eccentric.

5. A frame, two parallel shafts and two eccentrics mounted thereon, a ratchet tooth crown gear mounted on each of said shafts, in combination with a third shaft transverse to said shafts, and mounted in the eccentrics and two hard toothed ratchet faced pinions carried thereby, tubes of tough and elastic material inclosing said pinions, means to control the position of the eccentrics, and means to give the pinion shaft endwise motion.

6. A driving gear and a driven gear whose contact surfaces are hard angular teeth, in combination with an endless flexible driving medium, for tensile transmission of power.

7. A driving device, and a driven device, whose operating surfaces are composed of hard angular teeth and a membrane of tough and elastic material forming a tensional connection between said devices, in combination with means to adjust the penetration of the teeth into the membrane and foot driving mechanism.

8. A driving device and a driven device, the operating surface of one being composed of ratchet teeth, and the operating surface of the other being a tough and elastic membrane, thereby forming a tensional connection between said devices, in combination with means to adjust the penetration of the teeth into the membrane and foot driving mechanism.

Signed at New Brighton in the county of Richmond and State of New York, this 20th day of March A. D. 1909.

ARTHUR M. ALLEN.

Witnesses:
ARTHUR GILBERT ALLEN,
JAS. T. ALLEN.

It is hereby certified that in Letters Patent No. 1,026,237, granted May 14, 1912, upon the application of Arthur M. Allen, of New Brighton, New York, for an improvement in "Elastic Variable Gearing," an error appears in the printed specification requiring correction as follows: Page 2, line 1, for the word "addition" read *action;* and that the said Letters Patent should be read with this correction therein that the same may conform to the record of the case in the Patent Office.

Signed and sealed this 6th day of August, A. D., 1912.

[SEAL.]

C. C. BILLINGS,

*Acting Commissioner of Patents.*